United States Patent
Kabalnov

(10) Patent No.: US 6,261,350 B1
(45) Date of Patent: Jul. 17, 2001

(54) INCREASING CHROMA AND EDGE ACUITY OF DYE-BASED INKS BY UNDERPRINTING USING VESICLE TECHNIQUE

(75) Inventor: Alexey S Kabalnov, Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/376,272

(22) Filed: Aug. 17, 1999

(51) Int. Cl.$^7$ .................................................. C09D 11/00
(52) U.S. Cl. .................................. 106/31.33; 106/31.53; 106/31.56; 106/31.59; 106/31.43; 106/31.58
(58) Field of Search ............................. 106/31.33, 31.34, 106/31.59, 31.43, 31.58, 31.49, 31.53, 31.56

(56) References Cited

U.S. PATENT DOCUMENTS

| | | | |
|---|---|---|---|
| 4,783,220 | 11/1988 | Gamble et al. | 106/27 |
| 5,106,416 | 4/1992 | Moffatt et al. | 106/20 |
| 5,226,957 | 7/1993 | Wichramanayake et al. | 106/25 R |
| 5,492,559 | 2/1996 | Oliver et al. | 106/22 E |
| 5,565,022 | 10/1996 | Wickramanayake | 106/22 R |
| 5,624,484 | 4/1997 | Takahiashi et al. | 106/31.75 |
| 5,626,654 | 5/1997 | Breton et al. | 106/31.33 |
| 5,633,109 | 5/1997 | Jennings et al. | 430/115 |
| 5,640,187 | 6/1997 | Kashiwazaki et al. | 347/101 |
| 5,643,357 | 7/1997 | Breton et al. | 106/31.25 |
| 5,723,179 | 3/1998 | Wong et al. | 427/258 |
| 5,746,818 | 5/1998 | Yatake | 106/31.86 |
| 5,772,743 | 6/1998 | Gundlach et al. | 106/31.27 |
| 5,788,749 | 8/1998 | Breton et al. | 106/31.6 |
| 5,911,816 | 6/1999 | Gore | 106/31.34 |

OTHER PUBLICATIONS

Kuksis, "Yolk Lipids", Biochimica et Biophysica Acta. pp. 208–222 (1992), no month available.
Martin, "Pharmaceutical Manufacturing of Liposomes", Ch. 6, no date available.
D. March, "Lipid Classification", Handbook of Lipid Bilayers, CRC Press, Ch. I.1, no date available.
Szoka, Jr., "Comparative Properties and Methods of Preparation of Lipid Vesicles (Liposomes)", Ann. Rev. Biophys. Bioeng., pp. 467–508 (1980), no month available.
Israelachvili, "Intermolecular and Surface Forces", Academic Press, 2nd Ed. pp. 378–383, no date available.
Avanti Ploar Lipids, Inc.,Catalogue, pp. 14 and 16, no date available.

*Primary Examiner*—Helene Klemanski
*Assistant Examiner*—Veronica F. Faison

(57) ABSTRACT

Chroma is increased, color-to-color bleed is reduced, and edge acuity is increase for dye-based inks by an underprinting technique. A dye-based ink-jet ink printing system is provided, comprising cyan, yellow, and magenta inks, each ink contained in a separate ink pen. Each ink contains at least one water-soluble dye and vesicles. The vesicles are present in an amount sufficient to contain a substantial fraction of dye molecules within the water pool of the vesicles. The vesicles formed from a surfactant having a first polarity. The printing system further comprises an additional pen containing a fixer having a second polarity, opposite to the first polarity. Further, an ink-jet printer that includes the dye-based ink-jet ink printing system is configured to print the fixer on a print medium, followed by printing at least one ink on the fixer. A method for improving chroma, color-to-color bleed, and edge acuity in a dye-based ink-jet ink. The method comprises: (a) providing the above ink set; (b) providing an additional pen containing a fixer having a second polarity, opposite to the first polarity; (c) printing the fixer on a print medium; and (d) printing at least one ink on the fixer.

30 Claims, 3 Drawing Sheets micelle

|←— 5 nm —→|

$L_\alpha$ or $L_\beta$ phase vesicle

W

|←— 100 nm —→|

INCREASING CHROMA AND EDGE ACUITY OF DYE-BASED INKS BY UNDERPRINTING USING VESICLE TECHNIQUE

TECHNICAL FIELD

The present invention is directed to ink-jet inks, and, more particularly, to ink-jet ink compositions for increasing chroma and edge acuity, as well as improving color-to-color bleed, waterfastness, optical density of composite black, and decreasing strikethrough.

BACKGROUND ART

There is a considerable demand in a better image quality of ink-jet. The poor edge acuity, color-to-color bleed, and low chroma, as well as low waterfastness and smudge seem to be the main drawbacks of ink-jet, and this invention addresses these issues.

It is well-known that inks can be dye- or pigment-based. In dye-based inks, the colorant is present in a molecular-dispersed state. In pigment-based inks, the solid colorant is suspended in the ink vehicle. Both dye- and pigment-based inks have their advantages and drawbacks. Thus, dye-based inks provide vivid saturated colors. Because vivid colors can be achieved with a relatively low ink volume, the drying is relatively short, and the printouts show a low smudge, cockle and curl. On the other hand, pigmented inks are characterized by duller colors, but have a better edge acuity, strikethrough, and waterfastness.

Several techniques has been tried in order to improve the color vividness, edge acuity, waterfastness and bleed. One such technique is underprinting, which helps to stratify the colorant to the surface of the paper, reduces wicking, and improves color performance. Underprinting is defined as applying a transparent fluid on substrate prior the ink deposition. There are several patents addressing the technique of underprinting for better waterfastness and bleed control; see, e.g., U.S. Pat. No. 5,624,484, "Liquid Composition and Ink Set, and Image-Forming Process and Apparatus Using the Same", issued to K. Takahashi et al on Apr. 29, 1997, and U.S. Pat. No. 5,640,187, "Ink Jet Recording Method and Ink Jet Recording Apparatus Therefor", issued to A. Kashiwazaki et al on Jun. 17, 1997, both assigned to Canon; U.S. Pat. No. 5,723,179, "Method and Composition for Obtaining Waterfast Images From Ink Jet Inks", issued to R. W. Wong et al on Mar. 3, 1998, and assigned to Xerox Corp.; and U.S. Pat. No. 5,746,818, "Pigment Ink Composition Capable of Forming Image Having No Significant Bleeding or Feathering", issued to M. Yatake on May 5, 1998, and assigned to Seiko Epson. The underlying idea in underprinting is to bind the dyes with oppositely charged species. For example, anionic dyes can be bound by a cationic polymer, and cationic dyes can be bound by an anionic polymer. The clear underprinting fluid will be referred below as a fixing fluid, or fixer.

It is known that underprinting can increase the chroma (or, for black, optical density) of pigmented dispersions, such as carbon black-based inks. For example, black inks in Hewlett-Packard's DeskJet 890C printer are underprinted with a composite black, resulting in a considerable boost in the optical density. Also, the edge acuity of underprinted pigmented inks is normally improved.

However, for dye-based inks, the underprinting techniques known in art only marginally increase, or, most often, decrease chroma. Thus, as can be judged from the above-mentioned U.S. Pat. No. 5,723,179, underprinting decreased the optical density of the images (although underprinting made them waterfast). Similarly, in the commercial Canon BJC-700 printer, underprinting improves the edge acuity and bleed, but decreases the color vividness (see Examples, below). The decrease in chroma comes, among other things, from the plain increase in the volume of liquid poured on the paper. As a result of the higher liquid volume, the complex of the dye with the underprinting fixer penetrates deeper into the paper and the chroma is somewhat lost. As for the edge acuity of dye-based systems, it often improves, but at the expense of a poorer area fill uniformity. Underprinted dye images often show "mottle" and "muddy color", supposedly because of the low dot gain and dye aggregation.

Another approach to improving the color performance, waterfastness, and edge acuity is the incorporation of the color dyes into surfactant aggregates in solution. Thus, in U.S. Pat. No. 5,226,957 entitled "Solubilization of Water-Insoluble Dyes via Microemulsions for Bleedless, Non-Threading, High Print Quality Inks for Thermal Inkjet Printers", issued to P. Wickramanayake on Jul. 13, 1993, and assigned to the same assignee as the present application, it is suggested to incorporate an oil-soluble dye into a microemulsion, which contains solvents, surfactants, co-surfactants, and water. In another patent issued to P. Wickramanayake, U.S. Pat. No. 5,565,022, "Fast-Drying, Bleed-Free Ink-Jet Ink Compositions", issued on Oct. 15, 1996, and assigned to the same assignee as the present application, it is suggested to incorporate a dye into a mixture of an organic solvent, surfactant, and water, so that the dye and water-insoluble solvent are solubilized by the surfactant. In U.S. Pat. No. 5,643,357, "Liquid Crystalline Ink Compositions", issued to M. P. Brenton et al on Jul. 1, 1997, and assigned to Xerox Corp., an ink composition is suggested that contains a surfactant, and oil- or alcohol-soluble dye, and water. The formulation undergoes a phase transition upon heating from a microemulsion phase to a lamellar phase, which helps to stratify the inks to the surface of the paper, when the printing substrate is heated. U.S. Pat. No. 5,492,559, "Liquid Crystalline Microemulsion Ink Compositions", issued to J. F. Oliver et al on Feb. 20, 1996, and assigned to Xerox Corp., describes an ink formulation containing an aqueous phase, oil phase, and surfactant, and an oil-soluble dye, such that the system undergoes a microemulsion—liquid crystalline state transition with decreasing temperature. The use of another type of surfactant aggregates, vesicles, in ink-jet was first suggested in U.S. Pat. No. 4,783,220, "Vesicle Ink Compositions", issued to R. C. Gamble et al on Nov. 8, 1988, and co-assigned to Xerox and Vestar. The patentees disclose vesicle ink compositions, where the dyes are dissolved in the surfactant bilayer. This is deemed to improve waterfastness of the images. The patentees disclose different types of vesicle-forming surfactants, including phospholipids, dioctadecy-lammonium bromide, diacylglycerides and their ethoxylated derivatives.

In the U.S. Pat. No. 5,626,654, "Ink Compositions Containing Liposomes", issued to M. P. Breton et al on May 6, 1997, and assigned to Xerox, the patentees disclose vesicles in ink, wherein the vesicles are at least partially polymerized. Further, the patentees disclose the use of oppositely charged vesicles and dyes, or covalently bound vesicle-forming lipids and dyes. The benefit of this is claimed to be "the excellent edge quality and optical density".

U.S. Pat. No. 5,633,109, "Ink Compositions with Liposomes Containing Photochromic Compounds", issued to C. A. Jennings on May 27, 1997, and assigned to Xerox Corporation, discloses an ink composition which comprises an aqueous liquid vehicle, a photochromic material, and a vesicle-forming lipid. The ink compositions are photochromic; that is, the inks have two different states, each having a different absorption spectrum, and can be switched from one state to the other by suitable exposure of the printed ink to radiation of the appropriate wavelength.

U.S. Pat. No. 5,788,749, "Pigmented Ink Compositions Containing Liposomes", issued to M. P. Breton et al on Aug. 4, 1998, and assigned to Xerox, addresses the use of liposomes for pigmented inks. The advantages claimed are "excellent edge raggedness and excellent optical densities".

In U.S. Pat. No. 5,772,743, "Ink Compositions for Thermal Ink-jet Printing", issued to K. P. Gundlach et al on Jun. 30, 1998, and assigned to Xerox, the patentees disclose the use of specific fluorinated vesicle-forming surfactants.

A recent patent issued to M. Gore, U.S. Patent 5,911,816, "Liposomal Ink Compositions with Water-Insoluble Dyes and Pigments", issued on Jun. 15, 1999, and assigned to the same assignee as the present application, concerns the stabilization of pigmented dispersions by vesicles.

However, a need remains for a method for increasing chroma, edge acuity, and waterfastness and for reducing color-to-color bleed in dye-based ink-jet inks. In particular, underprinting techniques known to date improve waterfastness and bleed of dye-based systems, but make the color of the images duller. Similarly, vesicle, and micellar surfactant systems known in art and described above as references, are characterized by waterfast, but very dull colors.

DISCLOSURE OF INVENTION

In accordance with the present invention, chroma is increased, color-to-color bleed is reduced, and edge acuity, waterfastness, and strikethrough of dye-based inks are improved by employing underprinting in combination with vesicles. Such a combination provides an unexpected advantage over each of them when applied separately. Specifically, very high chroma values for the primary and binary colors become accessible.

The present invention includes a two-part color-printing system, that is, the inks and the fixer. The inks of the present invention are dye-based, and contain a plurality of vesicles. The dyes of the present invention are water-soluble and are distributed between the interior and exterior of the vesicles. This makes these vesicle inks different from those known in the prior art, where the oil-soluble dyes were incorporated into the surfactant bilayer. Although having the oil-soluble dyes dissolved in the surfactant bilayer improves the waterfastness of the image, it substantially compromises the color vividness, because the dye loading into the inks is limited by the solubility of the dye in the bilayers and by the volume fraction of the bilayer-forming surfactant in the system. The latter is naturally limited by the viscosity of ink-jet inks that normally cannot exceed about 4 cP.

In a preferred embodiment, the vesicles can be neutral, zwitterionic, or carry the charge of the same sign as the dye molecules. Thus, for anionic dyes, the vesicle-forming surfactant must be overall neutral or anionic, whereas for cationic dyes, the surfactant must be overall neutral or cationic. The mixture of several vesicle-forming surfactants, including the surfactants of the opposite charge, is also possible, provided that the overall vesicle charge remains of the same sign as that of the dyes. Also, the vesicle charge can be controlled by adding a polyelectrolyte, also called herein a polymeric binder, so that the polymer is bound to the surface of the vesicles by some physical or chemical mechanism. Again, for anionic dyes, the polymer must be anionic, and for cationic dyes, it must be cationic.

The color inks of the present invention are underprinted by a clear fixer that contains a polymer, or a salt of a polyvalent ion, with the charge that is opposite to the net charge of the vesicles. By using underprinting, one stratifies the dye molecules, pre-packed into the vesicle "bags" to the surface of the paper, such as shown in FIG. 2 and discussed in greater detail below. After the dye molecules are stratified, they are chemically bound to the oppositely charged fixer. This allows one to substantially improve the color performance of the inks, and in the same time, improve waterfastness, edge acuity, bleed, and strikethrough.

Therefore, a dye-based ink-jet ink printing system is provided, comprising cyan, yellow, and magenta inks, each ink contained in a separate ink pen. Each ink contains at least one water-soluble dye and vesicles. The vesicles are present in an amount sufficient to contain a substantial fraction of dye molecules within the vesicles. The vesicles are formed from a surfactant having a first electrical polarity. The printing system further comprises an additional pen containing a fixer having a second polarity, opposite to the first polarity.

Further, an ink-jet printer that includes the dye-based ink-jet ink printing system is configured to print the fixer on a print medium, followed by printing at least one ink on the fixer.

Also in accordance with the invention, a method for improving chroma, color-to-color bleed, and edge acuity in a dye-based ink-jet ink. The method comprises:

(a) providing an ink set comprising cyan, yellow, and magenta inks, each ink contained in a separate pen and containing at least one water-soluble dye and vesicles, the vesicles present in an amount sufficient to contain a substantial fraction of dye molecules within the vesicles, the vesicles formed from a surfactant having a first electrical charge polarity;

(b) providing an additional pen containing a fixer having a second polarity, opposite to the first polarity;

(c) printing the fixer on a print medium; and (d) printing at least one ink on the fixer.

BEST MODES FOR CARRYING OUT THE INVENTION

Figure 1A:
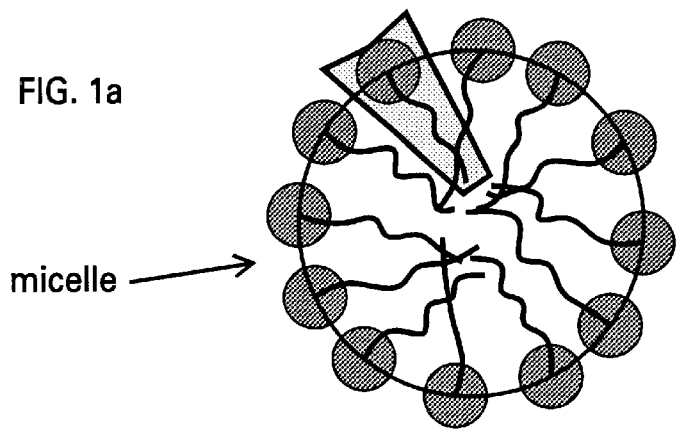
FIG. 1a is a schematic diagram, depicting a micelle.

Reference is now made in detail to a specific embodiment of the present invention, which illustrates the best mode presently contemplated by the inventor for practicing the invention. Alternative embodiments are also briefly described as applicable.

All concentrations herein are in weight percent, unless otherwise indicated. The purity of all components is that employed in normal commercial practice for thermal ink-jet inks. Some of the terms that will be used throughout this application are defined below.

Definitions

Color Measurement: Lightness-Chroma-Hue Values

As is well-known, the color, as preceived by humans, can be fully characterized by the set of three numerical values. One of the ways to present the color data is the Lightness-Chroma-Hue (L*C*h) cylindrical coordinate system. The hue values are measured in degrees and take on the values in the range from 0 to 360°. The hue angle h characterizes the color type, for example, red (h~30°), yellow (h~90°), or blue (h~270°). The lightness L* characterizes how bright is the color, that is, rates the color in terms of being light versus dark. L* values can vary from 0 (perfect black) to about 100. Finally, chroma measures how saturated is the color, that is, distinguishes vivid colors from the dull ones. The chroma values vary from 0 (white) to about 80 (highly saturated colors).

An alternative way to present the color space is the orthogonal L*a*b* coordinate system. There is a correspondence between the L*a*b* and L*C*h values, defined by the equations a*=C*cos(h) and b*=C*sin(h).

Edge Acuity

Edge acuity is a measure of ruggedness of the edges of images. In ink-jet, as opposed to, e.g., LaserJet®, the edge acuity is typically low, because the ink tends to wick along the paper fibers. In the present application, the edge acuity factor is evaluated as a ratio of the actual length of a ragged edge to the shortest distance joining two points on the edge. Accordingly, the larger is this ratio, the worse is the edge acuity.

Color-to-Color Bleed

The color-to-color bleed factor is similar to the edge acuity, with the difference that it characterizes the ruggedness of the line separating two adjacent color areas.

Strikethrough

Strikethrough is defined as the penetration of the ink on the backside of the paper. This effect is undesirable and needs to be reduced, in particular, if one needs to print on both sides of the paper.

Primary and Binary Colors

Color inks in ink-jet have cyan, magenta and yellow colors. Accordingly, the primary colors are cyan, magenta and yellow (C, M, Y). Binary colors are their binary combinations, that is, blue B=C+M, red R=M+Y, and green G=Y+C. Composite black (Comp-K=C+M+Y) is the black color formed by printing cyan, yellow and magenta inks together. It differs from the true black ink (true K), which is often supplied by ink-jet printers as a separate ink cartridge.

Cockle and Curl

Cockle and curl are irreversible deformations of paper after printing. These effects tend to increase with the total volume of inks deposited per unit area.

Color Efficiency

Color efficiency is determined as the ratio of the chroma of a color to the ink volume deposited.

Underprinting

Underprinting is defined as applying a transparent fluid on substrate prior the ink deposition. This transparent fluid, called fixer, can be deposited by using a separate printhead, or in some other way.

Smudge

Smudge is defined as smearing the printouts by hand, or by adjacent paper sheets after printing.

Discussion Regarding Vesicles in Inks

A. Surfactants

Surfactants are molecules composed of two molecular blocks: hydrophobic and hydrophilic joined together by a chemical bond. The hydrophobic block represents one or several alkyl chains. Because of this, the block is often called an alkyl tail. The hydrophilic block, also called the polar head, is either an ionic group, or a highly polar non-ionic group. In aqueous solutions, surfactants tend to aggregate in order to reduce the highly unfavorable contact between the alkyl tails and water. As a result, surfactants produce a variety of structures, such as small spherical aggregates (spherical micelles), rods (rodlike micelles, hexagonal phase), or planar sheets (lamellar phase). A micelle is schematically depicted in FIG. 1a. As can be seen, micelles typically have an oil core, due to the aggregation of the hydrophobic portions. The micelles are on the order of 5 nm in diameter.

B. Vesicles

Figure 1B:
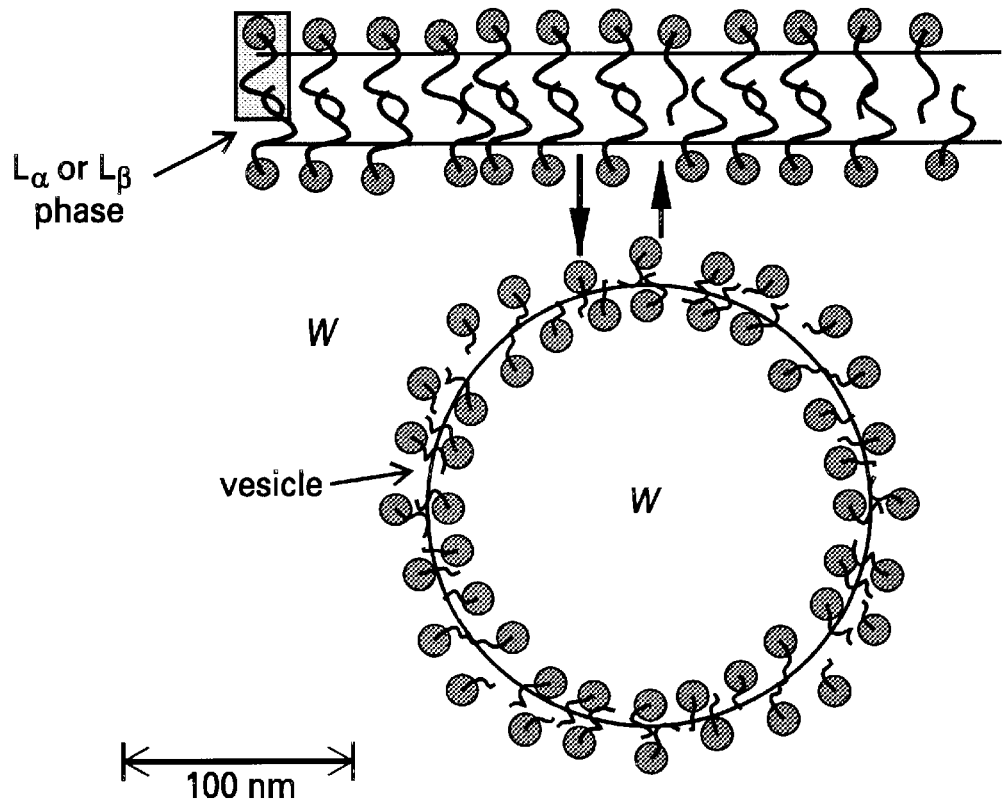
FIG. 1b is a schematic diagram, depicting a vesicle.

Vesicles or liposomes are another type of surfactant aggregate. They have a peculiar structure, resembling the one of a living cell, with the water (W) pool inside, and water medium outside (FIG. 1b). The walls of vesicles are made of surfactant bilayers: two or another even number of monolayers connected back-to back. The size of vesicles varies from as low as 20 nm (×10 molecular size) to macroscopic size (several mm), but are typically on the order of about 100 nm. The thickness of the vesicle wall varies from about 2 nm (one bilayer) to a few tens of nm (several bilayers). Although the shape of vesicles is often spherical, it can be made different. Some vesicles have the shape of disks, some others of infinite tubes or spirals. The shape of vesicles is not spherical, when their composition inside and outside is different. One of the most well known examples of a non-spherical vesicle is the red blood cell.

Vesicles are not thermodynamically stable, but rather form metastable systems. Their equilibrium counterpart is the lamellar phase (L$\alpha$ or L$\beta$). In this phase, surfactant bilayers are stacked together in planar sheets. Normally, lamellar phases are viscous and birefringent. The transition from the vesicle dispersion to lamellar phase has a large activation energy and is very slow for many surfactants. In many cases, vesicles form spontaneously on dispersing surfactants in water. In some other cases, vesicles form on mechanical agitation, or more drastic mechanical mixing procedures, such as sonication, or high-pressure homogenization.

Surfactant bilayers can exist in two states: fluid or solid. The solid bilayers transform into a liquid state above a certain temperature, called chain melting, or gel transition temperature $T_g$.

TABLE I

Chain Melting Points of Some Phosphatidylcholines*

| Phospholipid (acyl chain length:double bonds) | $T_g$, °C. |
|---|---|
| Dilauroyl phosphatidylcholine (12:0) | −1.8 |
| Dimyristoyl phosphatidylcholine (14:0) | 23 |
| Dipalmitoyl phosphatidylcholine (16:0) | 41 |
| Distearoyl phosphatidylcholine (18:0) | 55 |
| Dioleyl phosphatidylcholine (18:1) | −22 |

*Note - See, F. Szoka, Jr. et al, Annual Review of Biophysics and Bioengineering, Vol. 9, pp. 467–508 (1980).

In order for a surfactant to form vesicles, it must have a specific molecular geometry. In primitive terms, it must have the shape of a "cylinder", as opposed to a "wedge-shape", which favors another class of surfactant aggregates, micelles (discussed briefly above), see J. Israelachvili, *Intermolecular and Surface Forces*, Academic Press, San Diego, pp. 378–382 (1992). Many surfactants having two alkyl tails per molecule, as well as some single-tail surfactants tend to form vesicles. In surfactant science, one often uses the hydrophilic-lipophilic balance (HLB) number to characterize the surfactant properties. In terms of this number, vesicle-forming surfactants have the HLB value of about 6 to 14, as opposed to about 20 for micelle-forming surfactants. In terms of surfactant phase behavior, vesicles are formed over the region of two-phase co-existence of lamellar phase with water. Vesicles can be formed by anionic, cationic, zwitterionic and non-ionic surfactants. The most common class of vesicle-forming surfactants is natural phospholipids, briefly described below.

Natural Phospholipids.

Natural phospholipids are the main components of the living cell walls and can be found both in animals and plants. They contain two acyl groups esterified by glycerol, the third hydroxyl group of glycerol being esterified by phosphoric acid.

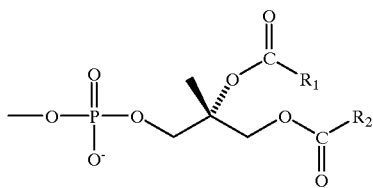

One of the remaining two hydroxyls of the phosphoric acid molecule is modified by various substituents, while the third one remains intact, and, normally, dissociated. The chemical structure of most common phospholipids is shown below. For lysophospholipids, one of the acyl chains ($R_1COO$ or $R_2COO$) is replaced by OH. The polar heads X and acyl chains are shown in Tables II and III below, see Avanti Polar Lipids Catalogue, Alabaster, Ala., (1995); see also A. Kuksis, "Yolk Lipids", *Biochim. Biophys. Acta*, Vol. 1124, p. 205 (1992).

Some of the structures of the polar heads are listed in Table II. The most naturally abundant phospholipids are phosphatidylcholine and phosphatidylethanolamine, which are zwitterionic (i.e., have both a cation and anion in their structure, overall neutral). Natural phospholipids of different origin are usually weakly anionic because of the presence of lysophospholipids, and other anionic lipids. Cationic natural lipids are virtually non-existent.

TABLE II

Polar Heads of Most Common Phospholipids

| Phospholipid | Approximate content in egg yolk phospholipid | X (see the chemical formula above) |
|---|---|---|
| Phosphatidylcholine | 73% | $(CH_2)_2N^+(CH_3)_3$ |
| Phosphatidylethanolamine | 11% | $(CH_2)_2N^+H_3$ |
| Lysophosphatidylcholine | 2% | $(CH_2)_2N^+(CH_3)_3$ |
| Phosphatidylserine | minor | $CH_2CH(COO^-Na^+)N^+H_3$ |
| Phosphatidic acid | minor | $2Na^+$ |
| Phosphatidylglycerol | minor | $CH_2CH(OH)CH_2OH + Na^+$ |

TABLE III

Acyl Groups $R_1COO$, $R_2COO$ of Common Phospholipids

| Acyl group (carbon number:number of double bonds) | Content in phospholipids of egg yolk |
|---|---|
| 16:0 (palmitoyl) | 34% |
| 18:1 (oleyl) | 31% |
| 18:2 (linoleyl) | 18% |
| 18:0 (stearoyl) | 11% |

The hydrocarbon (acyl) tails of phospholipids mostly represent the long-chain fatty acids, with n=16 to 22. The fatty acids are either saturated or unsaturated, with 1 to 6 double bonds. Normally, one of the chains is saturated, while the other is not, although in some living tissues, both chains are saturated.

All natural lipids form a lamellar phase at room temperature and, therefore, readily form vesicles. Of course, phospholipids are surfactants themselves and tend to adsorb at the air-water interface. However, their rate of adsorption is extremely slow; therefore, they do not act as paper penetrants when present in inks. However, some lipid decomposition products such as lysophospholipids adsorb much quicker and can affect spreading of inks on paper.

The main commercial sources of phospholipids are egg yolk and soya beans. Phospholipids can be also extracted from krill, bovine liver, and brain.

Techniques to Prepare and Characterize Vesicles

Because of the applications of vesicles for drug delivery, the techniques of vesicle preparation and characterization are well-known. Vesicles are routinely prepared in large volumes by high-pressure homogenizers (also called microfluidizers), produced, for example, by Avestin (Ottawa, Canada), APV Rannie (St. Paul, Minn.), and Niro Saavi (Parma, Italy). In this technique, a liquid jet of a swollen lipid dispersion is directed into a metal wall at a high pressure (~10,000 psi), where lamellar sheets break into vesicles. By this method, one can prepare 20 to 100 nm unilamellar vesicles. More primitive mechanical mixers can easily produce 1,000 nm vesicles and are convenient for making pre-mixes for high-pressure homogenizers.

Vesicle size can be measured by electron microscopy, light scattering, size exclusion chromatography, and ultracentrifuge. The entrapment of solutes inside can be measured by dialysis followed by solvent extraction. Dark field optical microscopy techniques allow one to visualize single surfactant bilayers. Giant macroscopic (several mm) vesicles can be visualized and manipulated, e.g., by pipette aspiration. This allows one to measure the bending and stretching elasticity moduli of the membranes.

Advantages of Vesicles in Ink-Jet Inks

The advantages and disadvantages of dye-based and pigment-based inks have been discussed above. Briefly, pigmented inks tend to provide good edge acuity, smudge-, smear-, light- and waterfastness, which are counterbalanced by low chroma and longer drying time. The pattern is completely opposite for the dyes, which have a good chroma, but worse edge acuity and permanence. The use of vesicles in ink-jet inks enables one to integrate the dye-based "solution" ink technology and the pigment-based dispersion ink technology into one, which combines the advantages of the both.

In essence, by placing dyes inside vesicles, one develops a particulate system that is dye-based, and therefore, highly chromatic. On the other hand, the particulate structure of the inks helps to separate the dyes from the ink vehicle on paper, which improves strikethrough, edge acuity, and bleed to the level of pigmented inks. The previous attempts to apply the vesicle technique to ink-jet were plagued by the attempt to utilize oil-soluble dyes, which were dissolved in the surfactant bilayer. This limited the amount of dye that could be incorporated into the ink formulation, and therefore, produced very dull colors. Similarly, the use of underprinting for vesicle-based systems was not considered.

Present Invention

Figure 2:
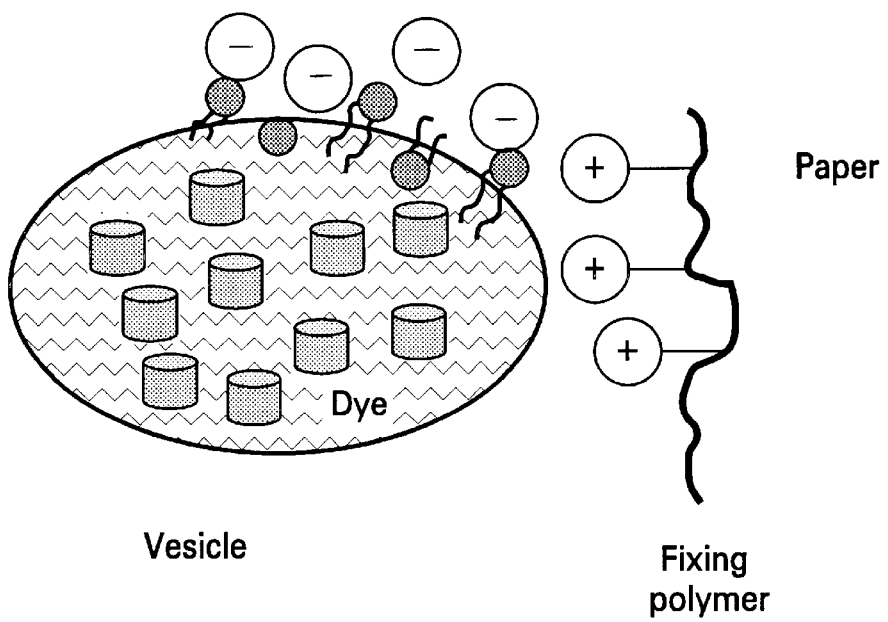
FIG. 2 is a schematic diagram, depicting the binding of a negatively-charged vesicle to a positively-charged fixing polymer layer formed on the print surface of paper.

In the present invention, the "solution" technology and "dispersion" technology of underprinting are combined by using the advantages of each of them in a single setup. At least a portion of the dye molecules is placed inside vesicles. These vesicles are then trapped by a fixing agent (e.g., an opposite charged polymer), as shown schematically in FIG. 2. Binding of vesicles to the fixer occurs quicker, because the dye molecules are already "pre-packed" within large "bags" (vesicles). The speed of binding is important, because it must occur prior to the ink penetration into the paper. Also, the dyes do not precipitate from the solution in a crystalline form, but form a soft gel that is adsorbed by the paper and provides a very uniform coverage. The dye precipitation at the surface is highly undesirable, because it creates a very patchy area fill.

The dye molecules are actually distributed between the interior of the vesicles and the exterior thereof. At least about 5% of the dye molecules are within the interior of the vesicles, as defined by the bi-layer walls.

With regard to ink-jet technology, the use of vesicle technique has been discussed above. However, the prior art was concerned with oil-soluble dyes that were dissolved in the surfactant bilayer, which was deemed to improve waterfastness of the inks. However, this path to improve waterfastness comes at the expense of a considerably lower dye load into the system, which compromises the color vividness of the inks. Also, the previous patentees have failed to recognize the use of underprinting in combination with vesicles. Yet, as the present inventor has discovered, using underprinting in combination with vesicles results in a substantial improvement over each of them separately, in particular, in chroma, edge acuity, bleed, strikethrough, and waterfastness.

The printing system of the current invention consists of two parts: the color inks and the fixer. Their composition is in detail discussed below.

1. Color (Cyan, Magenta, Yellow, or Black) Ink Composition

The inks of the present invention contain the following components:
1. water-soluble dye (or dye mixture);
2. vesicle-forming surfactant;
3. humectants and co-solvents;
4. optionally, a polymeric binder;
5. optionally, a spreading agent (surfactant);
6. optionally, a pH-controlling agent;
7. optionally, an antimicrobe agent;
8. optionally, an antioxidant;
9. optionally, a chelating agent; and
10. water.

These components are now described in more detail.

Dyes

Water-soluble dyes may be used in various salt forms, including sodium, potassium, lithium, ammonium, tetraethyleneamine and tetramethylammonium salts. Mixtures of the dyes can also be used.

Cyan dyes can be selected from the following list: Acid Blue 9, Direct Blue 199, Basic Blue 33, Projet Turquoise HA, Projet Turquoise H7G, Acid Blue 185.

Magenta dyes can be selected from the following list: Reactive Red 180, Acid Red 52, Procion Red H8B, Procion Red3-BNA, Projet Red PX6B, Magenta 377.

Yellow dyes can be selected from the following list: Acid Yellow 23, Direct Yellow 4, Projet Yellow 3RNA, Reactive Yellow 37, Direct Yellow 132, Acid Yellow 17, Acid Yellow 79, Direct Yellow 50, Ilford Y104 dye.

Black dyes can be selected from the following list: Food Black 2, Pacified Reactive Black 31, Zeneca Colours 286 dye, Zeneca Colours 287 dye.

Other dyes can also be used, provided that they have high enough solubility in water.

The concentration of the dye in the inks must be in the range from 0.1 to 10%, more preferably, from 1 to 5%. Both cationic and anionic dyes can be used, but it must be kept in mind that the dyes must not have a charge opposite to that of the vesicle-forming surfactant and the polymer binder, because it causes the dye precipitation and makes the ink processing more difficult.

Vesicle-Forming Surfactants

Any surfactant that forms vesicles in the inks and that has an appropriate charge can be used. The surfactant must either have the same charge as the dye(s), or be overall neutral or zwitterionic. For anionic dyes, acceptable surfactants can be selected from the following groups:

1. Phospholipids. Any vesicle-forming natural or synthetic phospholipids can be used, including phosphatidylcholines, phosphatidylethanolamines, phosphatidylserines, phosphatidylinositols, or mixtures thereof. The preferable acyl chain length is 10 to 26 carbon atoms, more preferably, 14 to 18 carbon atoms. The acyl chain can be saturated or unsaturated, however the chain melting temperature of the lipid must be low, below 0° C. In the most preferable implementation, the natural phospholipid mixture extracted from egg yolk, soya, bovine liver or brain, or krill is used.

2. Dialkyl phosphates of a general formula $R_1OR_2OPO_2^-$ $Me^+$, where the alkyl groups $R_1$ and $R_2$ have 4 to 20 carbon atoms. The alkyl groups can be saturated, unsaturated, branched or not. Again, it is important to have the gel transition temperature of the surfactant below 0° C. In addition, mono- or polyalkylphosphates may be used in the practice of the present invention.

3. Vesicle-forming diacyl glycosides.

4. Diacylglycerols, which can be partially ethoxylated.

5. Mixtures of anionic and cationic surfactants that form vesicles. It is known that the mixtures of oppositely charged surfactants tend to form vesicles; see, e.g., E. W. Kaler et al, *Science*, Vol. 245, p. 1371 (1989). Any vesicle-forming mixtures of an anionic and a cationic surfactants can be used, including, for example, (cetyltrimethylammonium tosylate+ dodecylbenzenesulfonate), or (sodium perfluorononanoate+dodecyltrimethylammonium bromide) surfactant pairs.

6. For cationic dyes, the surfactant can be selected from the group of tetraalkyl ammonium salts $R_1R_2R_3R_4N^+$ $X^-$, where two of the alkyl substituents, $R_1$ and $R_2$ are short-chain (e.g., methyl), and the other two are long-chain, for example, dodecyl; finally, $X^-$ is a counterion, for example, $Cl^-$, $Br^-$, or $HSO_4^-$.

Co-Solvents and Humectants

Humectants can be selected from the group consisting of polyols such as ethanediol; propanediols (1,2-propanediol, 1,3-propanediol, 2-ethyl-2-(hydroxymethyl)-1,3-propanediol, ethylhydroxypropanediol (EHPD); butanediols (e.g., 1,3-butanediol, 1,4-butanediol); pentanediols (e.g., 1,5-pentanediol); hexanediols (e.g., 1,6-hexanediol, 2,5-hexanediol); octanediols (e.g., 1,2-octanediol, 1,8-octanediol), decanediols (e.g., 1,2-decanediol); butanetriols (e.g., 1,2,4-butanetriol), pentanetriols (e.g., 3-methyl-1,3,5-pentanetriol); glycerol and mixtures thereof.

In addition to polyols, the humectants can include glycol mono-and polyethers, as well as thioglycol ethers, commonly employed in ink-jet compositions, such as polyethylene glycols (diethylene glycol, triethylene glycol, tetraethylene glycol), polypropylene glycols (e.g., dipropylene glycol, tripropylene glycol, tetrapropylene glycol), polymeric glycols (e.g., PEG 200, PEG 300, PEG 400, PPG 400) and thioglycol.

Other co-solvents can include the usual solvents used in ink-jet inks, such as 2-pyrrolidone, bis-hydroxyethylsulfone, and thiodiglycol.

The total amount of co-solvents and humectants in the inks must be 1 to 50 wt %, preferably, 5 to 30 wt %.

Polymeric Binders

As binders, one can use polyelectrolytes having the same ionic charge as the vesicle forming surfactant and the dyes. For anionic dyes, one can use random or block copolymers of acrylic acid or methacrylic acid, styrene, and acrylate ethers, such as methyl acrylate, butyl acrylate, hexyl acrylate, methyl methacrylate, butyl methacrylate, and hexylmethacrylate. Alternatively, the polymer can be a hydrolyzed copolymer of styrene and maleic acid anhydride SMA H1000, as produced by Elf Atochem, France. The molecular weight (weight average) of the binder must be from 1,000 to 100,000, preferably from 1,000 to 10,000. The acid must be partially transformed into the salt form by adding an alkali, such as NaOH, KOH, LiOH, or ammonia. The total amount of the polymer binder in the inks must be 0.1 to 10 wt %, preferably, 1 to 3 wt %.

Spreading Agents

In order to provide a uniform area fill coverage by the inks, one needs to incorporate spreading agents in the inks. The spreading agents must be compatible with the dye-vesicle-binder system, that is, it must either have the same charge or be non-ionic. Also, the spreading agent must not interfere with the vesicle forming surfactant and must be preferably separated from the vesicles. This means that fluorocarbon and silicon spreading agents are preferred as the spreading agents, although hydrocarbon surfactants can be also used. Typical loading of the spreading agent into the inks must be 0.01 to 10 wt %, preferably, 0.1 to 1 wt %.

pH-Controlling Agents

The preferable pH of the inks is close to neutral, from 6 to 9 pH units. The preferable pH buffer agents are tetramethyl ammonium hydroxide, Trizma base (Sigma), 2-N-morpholinoethanesulfonic acid (MES, Sigma), or mixture of monobasic and dibasic sodium phosphates.

For phospholipid-containing systems, the preferable pH is close to 7 to reduce the rate of phospholipid hydrolysis. This fact was apparently overlooked in the patent application of Gamble et al, in which the phospholipid vesicles were prepared at pH=1 to 2, in order to make the dyes soluble in the surfactant biliayer. However, at a pH value of 1 to 2, the phospholipids completely hydrolyze within several days; see, e.g., *Pharmaceutical Manufacturing of Liposomes*, by F. J. Martin, in *Specialized Drug Delivery Systems*, Tyle Praven, eds., Marcel Dekker, pp. 267–316 and FIG. 4 (1990).

Antimicrobial Agents

Examples of suitably employed microbial agents include, but not limited to NUOSEPT (Nudex, Inc.), UCARCIDE (Union Carbide), VANCIDE (RT Vanderuilt Co), and PROXEL (ICI America). The typical loading of these compounds into the inks must be 0.01 to 1 wt %, preferably, 0.1 to 0.5 wt %.

Antioxidants and Chelating Agents

Antioxidants, such as ascorbic acid and tocopherols can be added to the ink formulation to increase the chemical stability of the inks. Similar, chelating agents, such as ethylene diamine tetraacetic acid disodium salt (EDTA), can be added to complex impurities of polyvalent metals that promote oxidation. The amount of these additives must be 0.01 to 1 wt %, preferably 0.1 to 0.3 wt %.

2. Fixer

The second component of the printing system is the clear fixing fluid, or fixer. It must contain the following components:

1. a polyelectrolyte with the charge opposite to the charge of the dyes used, or a salt of a polyvalent ion, the charge of which is opposite to the charge of the dyes used;
2. optionally, an oppositely charged surfactant;
3. optionally, co-solvents and humectants;
4. optionally, spreading agents (surfactants) or a mixture thereof;
5. optionally, a pH-controlling agent; and
6. optionally, both the salt and polymer can be used in the same formulation.

These components are now discussed in more detail.

Oppositely Charged Polyelectrolyte

The following polymer selection guide should be followed:

1. The viscosity of the polymer solution must be as low as possible. This requires either a low molecular weight or highly branched structure.
2. The charge density of the fixer must be high, 0.1 to 0.3 equivalents per L in order to bind the dyes to the polymer.

For anionic dyes, the following cationic polymers can be used: polyethyleneimine, polyallylamine, polyvinylpyrrolidone, and other polyamines, quaternized by an acid to the salt form. Of the polymers listed above, polyethyleneimine is preferred because of its intrinsically branched structure. The molecular weight (weight average) must be within 500 to 100,000 range, preferably, from 500 to 50,000. Higher molecular weight polymers improve the waterfastness, but increase the ink viscosity.

Salt of Polyvalent Ion

For anionic dyes, salts of calcium, magnesium, barium, and aluminum can be used as, e.g., chloride and nitrate forms.

Oppositely Charged Surfactants

One can use various quaternized ammonium or pyridinium surfactants, such as dodecyltrimethylammnium chloride, cetyltrimethylammonium bromide, cetyltrimethylpyridinium chloride, and others.

Co-Solvents and Humectants

The same compounds that were listed above as the ink components can be used in the fixer, that is, 2-pyrrolidone, polyols, and polyol ethers.

Spreading Agents

It is important for the fixer to be reasonably penetrating into the paper. Because of this, the fixer must contain spreading agents. Many surfactants of a non-ionic type with a short and branched alkyl tails can be used for this purpose, such as Tergitol 15S7, Tergitol 15S5 (Union Carbide), or Surfynol 465 (Air Products). It has been found that it is beneficial to have a second fluorinated surfactant in the mixture with the hydrocarbon surfactant. The best effect has been seen with polyethoxylated fluorinated alcohols, such as Fluorad FC 170C (3M), Fluorad FC 170 (3M), or Zonyl FSN (DuPont de Nemours).

The surfactants must be present in the system in the amount of 0.01 to 10 wt %, preferably 0.1 to 2 wt %.

pH-Controlling Agents

In order to transform the polyamine polymers into the quaternized form, an acid must be added to the system. Preferable acids are organic acids such as citric acid, succinic acid, and acetic acid, or inorganic acids, such as hydrochloric acid. The preferable pH value is between 3 and 6. Alternatively, the amines can be quaternized by alkyl substituents, for example, a permethylated polyethylene imine can be used, as supplied by Polysciences, Warrrington, Pa.

3. Printing Mode

The inks and the fixer of this invention must be placed in separate pens and deposited on paper on the same pass. The fixer must be printed first, followed by the color pens, normally in the C-M-Y order. The fixer pen can be also used for over-coating the inks to improve their water- and smudgefastness. Also, the printing can be conducted in several passes, so that the inks and the fixer (F) are deposited in the multilayered fashion, that is, F-CMY-F-CMY-F-CMY, etc.

EXAMPLES

Example 1

Ink and Fixer Preparation

Ink preparation included the following stages.

1. Preparation of 500 g ink concentrates for each color, containing co-solvents, dyes, buffer and an antimicrobe agent.

2. Addition of 15 g of vesicle-forming surfactant and pre-mixing with a T25 Ultratorrax (Janke & Kunkel, IKA Labortechnik)) for 10 minutes. Typical vesicle size after mixing was about 1,000 nm, and the inks were quite turbid, in particular yellow inks, which had a characteristic "orange juice" appearance.

3. High-pressure homogenization with an APV Rannie homogenizer at 14,000 psi for six passes; the inks were cooled by a coil placed in a water bath. The flow rate of the homogenizer was 30 ml/min. After homogenization, the inks were no longer turbid, but slightly opalescent.

4. Addition of the solution of polymeric binder and spreading agent and final mixing Fixers were prepared by direct mixing of the components. Preferably, polyethylene imine, succinic acid, and water are mixed first, and then all the other components are added.

Example 2

Ink and Fixer Compositions

Some typical ink compositions are shown in Tables IV–X. The fixer compositions are shown in Tables XI–XIIa. The amounts of dyes in the in the compositions are shown in terms of optical densities at characteristic wavelengths at 1:10,000 dilution.

TABLE IV

Composition of Color Ink Set 1.

| Cyan | | Magenta | | Yellow | |
|---|---|---|---|---|---|
| 1,5-pentanediol (Tricon Colors, Inc, Elmwood Park, NJ) | 6.8 wt % | 1,5-pentanediol (Tricon Colors, Inc, Elmwood Park, NJ) | 6.8 wt % | diethyleneglycol (Aldrich) | 3.4 wt % |
| 2-ethyl-1,3-propanediol (EHPD, Aldrich) | 6.4 wt % | EHPD (Aldrich) | 6.4 wt % | EHPD (Aldrich) | 6.8 wt % |
| 2-pyrrolidone (Aldrich) | 6.4 wt % | 2-pyrrolidone (Aldrich) | 6.4 wt % | 2-pyrrolidone (Aldrich) | 3.4 wt % |
| Trizma base (Sigma) | 0.17 wt % | Trizma base (Sigma) | 0.17 wt % | 2-N-morpholinoethanesulfonic acid (MES (Sigma) | 0.17 wt % |
| Proxel GXL (ICI America) | 0.17 wt % | Proxel GXL (ICI America) | 0.17 wt % | Proxel GXL (ICI America) | 0.17 wt % |
| Fluorad FC-99 (3M) | 0.85 wt % | Fluorad FC-99 (3M) | 0.85 wt % | Fluorad FC-99 (3M) | 0.85 wt % |
| Egg yolk lecithin (60 wt % Sigma) | 2.6 wt % | Egg yolk lecithin (60 wt % Sigma) | 2.6 wt % | Egg yolk lecithin (60 wt % Sigma) | 2.6 wt % |
| Acrylic polymer binder (duPont de Nemours, Wilmington, DE) | 1.7 wt % | Acrylic polymer binder (duPont de Nemours, Wilmington, DE) | 1.7 wt % | Acrylic polymer binder (duPont de Nemours, Wilmington, DE) | 1.7 wt % |
| TMA-Direct Blue 199 (D at 1:10,000) (Zeneca Specialist Colours, New Castle, DE) | D = 0.14 (622 nm) | Reactive Red 180 (D at 1:10,000) (Clariant Corp., Charlotte, NC) | D = 0.14 (542 nm) | TMA-Acid Yellow 23 (D at 1:10,000) (Hilton Davis Co., Cincinnati, OH) | D = 0.20 (428 nm) |
| Na-Acid Blue 9 (D at 1:10,000) (Warner-Jenkinson Co., Inc., St. Louis, MO) | D = 0.26 (630 nm) | Li-Acid Red 52 (D at 1:10,000) (Tricon Colors, Inc, Elmwood Park, NJ) | D = 0.22 (566 nm) | | |
| water | balance | water | balance | water | balance |

TABLE V

Composition of Color Ink Set #2.

| Cyan | | Magenta | | Yellow | |
|---|---|---|---|---|---|
| 1,5-pentanediol (Tricon Colors, Inc, Elmwood Park, NJ) | 6.8 wt % | 1,5-pentanediol (Tricon Colors, Inc, Elmwood Part, NJ) | 6.8 wt % | Diethyleneglycol (Aldrich) | 3.4 wt % |

TABLE V-continued

Composition of Color Ink Set #2.

| Cyan | | Magenta | | Yellow | |
|---|---|---|---|---|---|
| 2-ethyl (1,3-propanediol) (EHPD, Aldrich) | 6.4 wt % | EHPD (Aldrich) | 6.4 wt % | EHPD (Aldrich) | 6.8 wt % |
| 2-pyrrolidone (Aldrich) | 6.4 wt % | 2-pyrrolidone (Aldrich) | 6.4 wt % | 2-pyrrolidone (Aldrich) | 3.4 wt % |
| Trizma base (Sigma) | 0.17 wt % | Trizma base (Sigma) | 0.17 wt % | 2-N-morpholinoethanesulfonic acid (MES) (Sigma) | 0.17 wt % |
| Proxel GXL (ICI America) | 0.17 wt % | Proxel GXL (ICI America) | 0.17 wt % | Proxel GXL (ICI America) | 0.17 wt % |
| Fluorad FC-99 (3M) | 0.85 wt % | Fluorad FC-99 (3M) | 0.85 wt % | Fluorad FC-99 (3M) | 0.85 wt % |
| Egg yolk lecithin (60 wt %, Sigma) | 2.6 wt % | Egg yolk lecithin (60 wt %, Sigma) | 2.6 wt % | Egg yolk lecithin (60 wt %, Sigma) | 2.6 wt % |
| Acrylic polymer binder (duPont de Nemours, Wilmington, DE) | 1.7 wt % | Acrylic polymer binder (duPont de Nemours, Wilmington, DE) | 1.7 wt % | Acrylic polymer binder (duPont de Nemours, Wilmington, DE) | 1.7 wt % |
| TMA-Direct Blue 199 (D at 1:10,000) (Zeneca Specialist Colours, New Castle, DE) | D = 0.09 (622 nm) | Magenta 377 (Ilford AG, Fribourg, Switzerland) | 0.09 (518 nm) | Direct Yellow 132 (Clariant Corp., Charlotte, NC) | 0.14 (402 nm) |
| Na-Acid Blue 9 (D at 1:10,000) (Warnebr-Jenkinson Co., Inc., St. Louis, MO) | D = 0.16 (630 nm) | Li-Acid Red 52 (D at 1:10,000) (Tricon Colors, Inc, Elmwood Park, NJ) | D = 0.14 (566 nm) | TMA-Acid Yellow 23 (D at 1:10,000) (Hilton Davis Co., Cincinnati, OH) | D = 0.04 (428 nm) |
| water | balance | water | balance | water | balance |

TABLE IV

Composition of Color Ink Set #3.

| Cyan | | Magenta | | Yellow | |
|---|---|---|---|---|---|
| 1,5-pentanediol (Tricon Colors, Inc, Elmwood Park, NJ) | 6.8 wt % | 1,5-pentanediol (Tricon Colors, Inc, Elmwood Park, NJ) | 6.8 wt % | diethyleneglycol (Aldrich) | 3.4 wt % |
| 2-ethyl-1,3-propanediol (EHPD, Aldrich) | 6.4 wt % | EHPD (Aldrich) | 6.4 wt % | EHPD (Aldrich) | 6.8 wt % |
| 2-pyrrolidone (Aldrich) | 6.4 wt % | 2-pyrrolidone (Aldrich) | 6.4 wt % | 2-pyrrolidone (Aldrich) | 3.4 wt % |
| Trizma base (Sigma) | 0.17 wt % | Trizma base (Sigma) | 0.17 wt % | 2-N-morpholinoethanesulfonic acid (MES) (Sigma) | 0.17 wt % |
| Proxel GXL (ICI America) | 0.17 wt % | Proxel GXL (ICI America) | 0.17 wt % | Proxel GXL (ICI America) | 0.17 wt % |
| Fluorad FC-99 (3M) | 0.85 wt % | Fluorad FC-99 (3M) | 0.85 wt % | Fluorad FC-99 (3M) | 0.85 wt % |
| Sodium perfluorononanoate (Fluka) | 0.7 wt % | Sodium perfluorononanoate (Fluka) | 0.7 wt % | Sodium perfluorononanoate (Fluka) | 0.7 wt % |
| Dodecyltrimethylammonium bromide (Sigma) | 0.48 wt % | Dodecyltrimethylammonium bromide (Sigma) | 0.48 wt % | Dodecyltrimethylammonium bromide (Sigma) | 0.48 wt % |
| Acrylic polymer binder (duPont de Nemours, Wilmington, DE) | 1.7 wt % | Acrylic polymer binder (duPont de Nemours, Wilmington, DE) | 1.7 wt % | Acrylic polymer binder (duPont de Nemours, Wilmington, DE) | 1.7 wt % |
| TMA-Direct Blue 199 (D at 1:10,000) (Zeneca Specialist Colours, New Castle, DE) | D = 0.14 (622 nm) | Reactive Red 180 (D at 1:10,000) (Clariant Corp., Charlotte, NC)) | D = 0.14 (542 nm) | TMA-Acid Yellow 23 (D at 1:10,000) (Hilton Davis Co., Cincinnati, OH) | D = 0.20 (428 nm) |
| Na-Acid Blue 9 (D at 1:10,000) (Warner-Jenkinson Co., Inc., St. Louis, MO) | D = 0.26 (630 nm) | Li-Acid Red 52 (D at 1:10,000) (Tricon Colors, Inc, Elmwood Park, NJ) | D = 0.22 (566 nm) | | |
| water | balance | water | balance | water | balance |

TABLE VII

Composition of Color Ink Set #4.

| Cyan | | Magenta | | Yellow | |
|---|---|---|---|---|---|
| 1,5-pentanediol (Tricon Colors, Inc, Elmwood Park, NJ) | 6.8 wt % | 1,5-pentanediol (Tricon Colors, Inc, Elmwood Park, NJ) | 6.8 wt % | diethyleneglycol (Aldrich) | 3.4 wt % |
| 2-ethyl-1,3-propanediol (EHPD, Aldrich) | 6.4 wt % | EHPD (Aldrich) | 6.4 wt % | EHPD (Aldrich) | 6.8 wt % |
| 2-pyrrolidone (Aldrich) | 6.4 wt % | 2-pyrrolidone (Aldrich) | 6.4 wt % | 2-pyrrolidone (Aldrich) | 3.4 wt % |
| Trizma base (Sigma) | 0.17 wt % | Trizma base (Sigma) | 0.17 wt % | 2-N-morpholinoethanesulfonic acid (MES) (Sigma) | 0.17 wt % |
| Proxel GXL (ICI America) | 0.17 wt % | Proxel GXL (ICI America) | 0.17 wt % | Proxel GXL (ICI America) | 0.17 wt % |
| Fluorad FC-99 (3M) | 0.85 wt % | Fluorad FC-99 (3M) | 0.85 wt % | Fluorad FC-99 (3M) | 0.85 wt % |
| Sodium perfluorononanoate (Fluka) | 0.48 wt % | Sodium perfluorononanoate (Fluka) | 0.48 wt % | Sodium perfluorononanoate (Fluka) | 0.48 wt % |
| Dodecyltrimethylammonium bromide (Sigma) | 1.5 wt % | Dodecyltrimethylammonium bromide (Sigma) | 1.5 wt % | Dodecyltrimethylammonium bromide (Sigma) | 1.5 wt % |
| Acrylic polymer binder (duPont de Nemours, Wilmington, DE) | 1.7 wt % | Acrylic polymer binder (duPont de Nemours, Wilmington, DE) | 1.7 wt % | Acrylic polymer binder (duPont de Nemours, Wilmington, DE) | 1.7 wt % |

TABLE VII-continued

Composition of Color Ink Set #4.

| Cyan | | Magenta | | Yellow | |
|---|---|---|---|---|---|
| TMA-Direct Blue 199 (D at 1:10,000) (Zeneca Specialist Colours, New Castle, DE) | D = 0.14 (622 nm) | Reactive Red 180 (D at 1:10,000) (Clariant Corp., Charlotte, NC)) | D = 0.14 (542 nm) | TMA-Acid Yellow 23 (D at 1:10,000) (Hilton Davis Co., Cincinnati, OH) | D = 0.20 (428 nm) |
| Na-Acid Blue 9 (D at 1:10,000) (Warner-Jenkinson Co., Inc., St. Louis, MO) | D = 0.26 (630 nm) | Li-Acid Red 52 (D at 1:10,000) (Tricon Colors, Inc, Elmwood Park, NJ) | D = 0.22 (566 nm) | | |
| water | balance | water | balance | water | balance |

TABLE VIII

Composition of Color Ink Set #5.

| Cyan | | Magenta | | Yellow | |
|---|---|---|---|---|---|
| 1,5-pentanediol (Tricon Colors, Inc, Elmwood Park, NJ) | 6.8 wt % | 1,5-pentanediol (Tricon Colors, Inc, Elmwood Park, NJ) | 6.8 wt % | diethyleneglycol (Aldrich) | 3.4 wt % |
| 2-ethyl-1,3-propanediol (EHPD, Aldrich) | 6.4 wt % | EHPD (Aldrich) | 6.4 wt % | EHPD (Aldrich) | 6.8 wt % |
| 2-pyrrolidone (Aldrich) | 6.4 wt % | 2-pyrrolidone (Aldrich) | 6.4 wt % | 2-pyrrolidone (Aldrich) | 3.4 wt % |
| Trizma base (Sigma) | 0.17 wt % | Trizma base (Sigma) | 0.17 wt % | 2-N-morpholinoethanesulfonic acid (MES) (Sigma) | 0.17 wt % |
| Proxel GXL (ICI America) | 0.17 wt % | Proxel GXL (ICI America) | 0.17 wt % | Proxel GXL (ICI America) | 0.17 wt % |
| Fluorad FC-99 (3M) | 0.85 wt % | Fluorad FC-99 (3M) | 0.85 wt % | Fluorad FC-99 (3M) | 0.85 wt % |
| Zelec NK (Stepan, Northfield, IL) | 5 wt % | Zelec NK (Stepan) | 5 wt % | Zelec NK (Stepan) | 5 wt % |
| Acrylic polymer binder (duPont de Nemours, Wilmington, DE) | 1.7 wt % | Acrylic polymer binder (duPont de Nemours, Wilmington, DE) | 1.7 wt % | Acrylic polymer binder (duPont de Nemours, Wilmington, DE) | 1.7 wt % |
| TMA-Direct Blue 199 (D at 1:10,000) (Zeneca Specialist Colours, New Castle, DE) | D = 0.14 (622 nm) | Reactive Red 180 (D at 1:10,000) (Clariant Corp., Charlotte, NC)) | D = 0.14 (542 nm) | TMA-Acid Yellow 23 (D at 1:10,000) (Hilton Davis Co., Cincinnati, OH) | D = 0.20 (428 nm) |
| Na-Acid Blue 9 (D at 1:10,000) (Warner-Jenkinson Co., Inc., St. Louis, MO) | D = 0.26 (630 nm) | Li-Acid Red 52 (D at 1:10,000) (Tricon Colors, Inc, Elmwood Park, NJ) | D = 0.22 (566 nm) | | |
| water | balance | water | balance | water | balance |

TABLE IX

Composition of Black Ink #6.

| | |
|---|---|
| glycerol (Sigma) | 10 wt % |
| diethyleneglycol (Aldrich) | 4 wt % |
| 2-pyrrolidone (Aldrich) | 4 wt % |
| Trizma base (Sigma) | 0.2 wt % |
| Proxel GXL (ICI America)) | 0.2 wt % |
| Fluorad FC-99 (3M) | 1 wt % |
| Egg yolk lecithin (60% Sigma) | 3 wt % |
| Acrylic polymer binder (dupont de Nemours, Wilmington, DE) | 2 wt % |
| Food Black 2 (D at 1:10,000) (Bayer, Rock Hill, SC) | D = 0.2 (average over visible range) |
| water | balance |

TABLE X

Composition of Fixer #1.

| | |
|---|---|
| LEG-1 (Lipo Chemicals, Inc., Paterson, NJ) | 4 wt % |
| 1,5-pentanediol (Tricon Colors, Inc, Elmwood Park, NJ) | 2 wt % |
| 2-pyrrolidone (Aldrich) | 10 wt % |
| Tergitol 15S7 (Union Carbide) | 2 wt % |
| Fluorad FC170C (3M) | 2 wt % |
| Polyethyleneimine, M = 2,000 (Aldrich) | 2.5 wt % |
| Succinic acid (Sigma) | 5 wt % |

TABLE XI

Composition of Fixer #2.

| | |
|---|---|
| glycerol (Sigma) | 15 wt % |
| Zonyl FSN (Dupont de Nemours) | 1 wt % |
| cethyltrimethylammonium chloride (Aldrich) | 3 wt % |
| polyethyleneimine, M= 2,000 (Aldrich) | 2.5 wt % |
| succinic acid (Sigma) | 5 wt % |

TABLE XII

Composition of Fixer #3.

| | |
|---|---|
| 1,5-pentanediol (Tricon Colors, Inc, Elmwood Park, NJ) | 8 wt % |
| 2-ethyl-1,3-propanediol (EHPD) (Aldrich) | 7.5 wt % |
| 2-pyrrolidone (Aldrich) | 7.5 wt % |
| succinic acid (Sigma) | 7 wt % |
| calcium chloride (Aldrich) | 10 wt % |
| Tergitol 15S5 (Union Carbide) | 1.5 wt % |
| Dowfax 8390 (Dow Chemical) | 1 wt % |
| water | Balance |

Example 3
Typical Physical Properties of the Inks and the Fixer

Tables XIII and XIV show the physical properties of Inks #1, Fixer #1, and Fixer #2. The viscosity was measured by a Brookfield viscometer at 60 rpm. The surface tension was measured by a K10ST Kruss Tensiometer by the plate method. The particle size was measured by a Nicomp particle size analyzer (Particle Sizing Systems, Inc., Santa Barbara, Calif., USA) at 90° scattering angle and ~1:10000 dilution by water in vesicle mode. The measurement of particle size of magenta inks by dynamic light scattering was not possible because of the dye fluorescence. It can be expected that the size is similar to cyan because the ink vehicles of magenta and cyan are identical.

TABLE XIII

Physical Properties of Ink Set #1 at 25° C.

| Color | Viscosity, cP | Surface tension mN/m | pH | Average diameter, nm | Optical density (wavelength) | Freezing point ° C. | Appearance |
|---|---|---|---|---|---|---|---|
| CYAN | 2.7 | 34.8 | 8.77 | 62 ± 37 | 0.38 (628 nm) 0.16 (336 nm) | −5 | normal |
| MAGENTA | 2.6 | 34.1 | 7.92 | unknown | 0.26 (562 nm) 0.10 (314 nm) | −5 | normal |
| YELLOW | 2.2 | 34.8 | 7.97 | 66 ± 31 | 0.19 (428 nm) | −3 | slightly opalescent |

TABLE XIV

Physical Properties of Fixers #1 and #2 at 25° C.

| Fixer | Viscosity, cP | Surface tension, mN/m | pH | Appearance |
|---|---|---|---|---|
| Fixer #1 | 3.9 | 22.1 | 4.4 | yellowish-brownish |
| Fixer #2 | 2.6 | 31.3 | 4.3 | yellowish |

Example 4

Printing Testbeds

The printing was conducted with a HP 2000c Hewlett Packard printer. The fixer was filled in the black pen (Hewlett Packard part #HPC4800A), and the color inks were filled into the color pens (Hewlett Packard part #HPC4801A HPC4802A and HPC4803A). Rectangular blocks with the size 2.5×3 cm or 1.5×1.5 cm were printed. The ink volume per 1/600 inch pixel was 8 pL for primary colors (cyan, magenta and yellow), and 16 pL for binary colors (red, green, and blue). The volume of the fixer deposited was equal to the volume of inks. The fixer and the inks were deposited on the same pass, and the fixer was always deposited first.

The printing was done on Champion Data Copy paper (Champion, Denver, Colo.) and Hewlett Packard Premium Photopaper Product #C6039A).

Example 5

Color Measurement

The color measurements were made with a Minolta CM-503 C spectrophotometer at 2° and D65 (day light) conditions. The set of three values, that is, lightness, $L^*$, chroma, $C^*$, and hue, h, were generated. The vividness of the color was compared in terms of the chroma values $C^*$. The typical hue angles for the primary colors studied were 90–100, 344–355, and 235–245 degrees for yellow, magenta, and cyan, respectively. For binary colors, the hue angles were 25–35°, 145–155°, and 285–295° for red, green, and blue, respectively.

Example 6
Comparison of Chromas $C^*$ of Various Inks on Champion Data Copy Paper Table XV compares the chroma values of the ink set #2 for primary and binary colors with those of the commercial HP-2000c ink. One can see that these inks, being underprinted, produce more vivid colors than the commercial HP-2000c ink. Also, one can see that underprinting substantially improves the color vividness of the ink set #2, while it does not improve it for the default BP-2000c ink. The particular advantage is seen in red color.

TABLE XV

Chroma Values of Ink Set #2 on Champion Data Copy Paper.

| Color | Ink Set #2 Underprinted by Fixer #1 | HP-2000c inks, Underprinted by Fixer #1 | Ink Set #2, No Underprint | Commercial HP-2000c Ink, No Underprint |
|---|---|---|---|---|
| Cyan $C^*$ | 51 | 48 | 47 | 46 |
| Magenta $C^*$ | 68 | 64 | 64 | 61 |
| Yellow $C^*$ | 83 | 78 | 79 | 78 |
| Red $C^*$ | 63 | 57 | 55 | 58 |
| Green $C^*$ | 64 | 61 | 62 | 62 |
| Blue $C^*$ | 45 | 40 | 39 | 40 |

Example 7

Comparison of Chromas $C^*$ of Various Inks on Hewlett Packard Premium Photopaper Table XVI compares the chroma values of the ink set #2 for primary and binary colors with those of the commercial HP-2000c ink. One can see that these inks, being underprinted, produce more vivid colors than the commercial BP-2000c ink. Also, one can see that underprinting substantially improves the color vividness of the ink set #2, while it does not improve it for the default HP-2000c ink.

The particular advantage is seen in red color.

TABLE XVI

Chroma Values of Ink #2 on Hewlett-Packard Premium Photopaper.

| Color | Ink Set #2 Under- printed by Fixer #1 | HP-2000c inks, Under- printed by Fixer #1 | Ink Set #2, No Underprint | Commercial HP-2000c Ink, No Underprint |
|---|---|---|---|---|
| Cyan C* | 58 | 52 | 53 | 51 |
| Magenta C* | 87 | 78 | 75 | 79 |
| Yellow C* | 99 | 83 | 86 | 83 |
| Red C* | 85 | 76 | 75 | 82 |
| Green C* | 88 | 77 | 84 | 77 |
| Blue C* | 77 | 70 | 69 | 72 |

Example 8

Chromas C* of Ink Set #1 on Champion Data Copy Paper

Figures 3A, 3B:
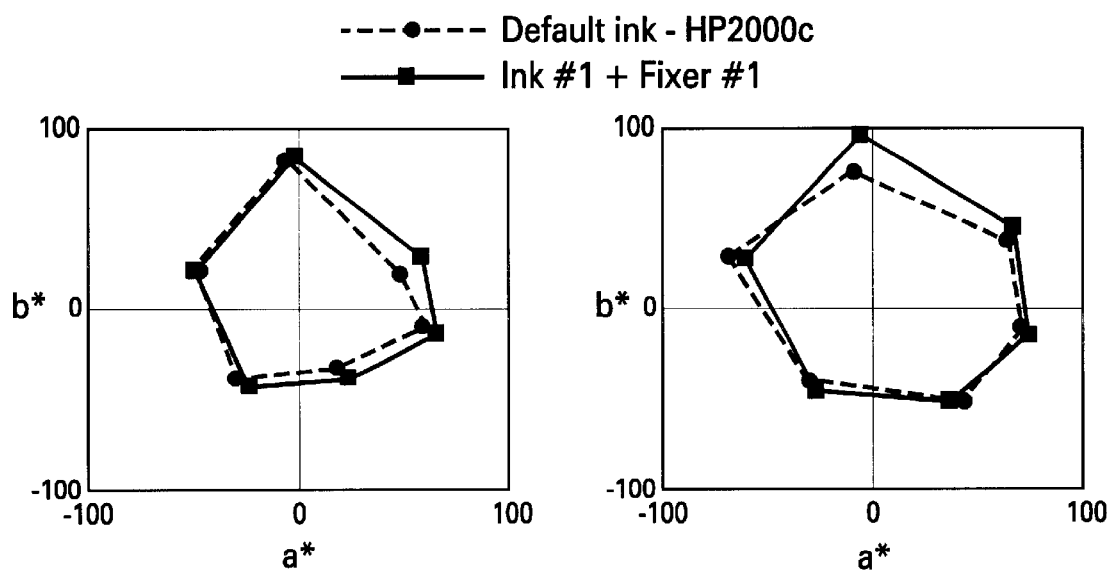
FIGS. 3a and 3b are a*–b* color space plots of two different inks on Champion Data Copy paper (FIG. 3a) and on Hewlett-Packard Premium Photopaper (FIG. 3b)

Table XVII compares the chroma values of the ink set #1 for primary and binary colors with those of the commercial HP-2000c ink. One can see that these inks, being underprinted, produce more vivid colors than the commercial HP-2000c ink, except for the green. The particular advantage is seen in red color. FIG. 3a shows the color space diagram in a* b* coordinates for ink set #1 underprinted by fixer #1 with the default HP-2000c ink on Champion Data Copy paper.

TABLE XVII

Chroma Values of Ink Set #1 on Champion Data Copy Paper.

| Color | Ink Set #1 Under- printed by Fixer #1 | HP-2000c Inks, Under- printed by Fixer #1 | Ink Set #1, No Underprint | Commercial HP-2000c Ink, No Underprint |
|---|---|---|---|---|
| Cyan C* | 49 | 47 | 48 | 47 |
| Magenta C* | 69 | 63 | 65 | 63 |
| Yellow C* | 86 | 78 | 85 | 78 |
| Red C* | 67 | 55 | 63 | 55 |
| Green C* | 54 | 60 | 59 | 61 |
| Blue C* | 45 | 39 | 43 | 38 |

Example 9

Chromas C* of Ink Set #1 on Hewlett Packard Premium Photopaper

Table XVIII compares the chroma values of the ink set #1 for primary and binary colors with those of the commercial HP-2000c ink. One can see that these inks, being underprinted, produce more vivid colors than the commercial HP-2000c ink, except for the green and blue. The particular advantage is seen in yellow red color. FIG. 3b shows the color space diagram in a* b* coordinates for ink set #1 underprinted by fixer #1 with the default HP-2000c ink on Hewlett Packard Premium Photopaper.

TABLE XVIII

Chroma Values of Ink Set #1 on HP Premium Photopaper.

| Colors | Ink Set #1 Underprinted by Fixer #1 | HP-2000c Inks, Underprinted by Fixer #1 | Commercial HP-2000c Ink, No Underprint |
|---|---|---|---|
| Cyan C* | 55 | 52 | 51 |
| Magenta C* | 80 | 78 | 77 |

TABLE XVIII-continued

Chroma Values of Ink Set #1 on HP Premium Photopaper.

| Colors | Ink Set #1 Underprinted by Fixer #1 | HP-2000c Inks, Underprinted by Fixer #1 | Commercial HP-2000c Ink, No Underprint |
|---|---|---|---|
| Yellow C* | 96 | 83 | 76 |
| Red C* | 83 | 76 | 77 |
| Green C* | 66 | 77 | 74 |
| Blue C* | 67 | 70 | 69 |

Example 10

Effect of Vesicles on the Color Vividness of Ink Set #2

In order to evaluate the contribution of underprinting to the color vividness increase, a control experiment was conducted. Ink set #2A had the same composition as ink set #2, but did not contain the vesicle-forming surfactant and the binder. One can see in Table XVIX below that underprinting of these inks does not improve the color vividness, except for 2 to 3 chroma units increase in cyan and magenta. For red and blue, the chroma actually decreases.

Therefore, the presence of these components is essential for the chroma increase in underprinting setup.

TABLE XVIX

Effects of Vesicles and Binder on Underprinting Efficiency.

| Colors | Ink Set #2, Un- derprinted by Fixer #1 | Ink Set #2A without Vesicles and Binder, Underprinted with Fixer #1 |
|---|---|---|
| Cyan C* | 51 | 48 |
| Magenta C* | 68 | 64 |
| Yellow C* | 83 | 78 |
| Red C* | 63 | 57 |
| Green C* | 64 | 61 |
| Blue C* | 45 | 40 |

Example 11

Effect of Vesicles and Binder Separately on the Color Vividness in Underprinting Setup (Single Pass Printing)

To discriminate the contributions of the binder and vesicles, the following control experiments were conducted. Ink set #1a had the same composition as ink set #1, but did not contain the vesicle-forming surfactant and the binder. Ink set #1b did not contain vesicles, but contained the binder. Ink set #1c did not contain the binder but contained vesicles. From Table XX, one can see that both the binder and vesicles separately have a beneficial effect on the color vividness, but the effect is magnified when both are present.

TABLE XX

Effects of Vesicles and Binder on Color Vividness in Underprinting Setup.

| colors | Ink Set #1, Underprinted by Fixer #1 | Ink Set #1a without Vesicles and Binder, Underprinted with Fixer #1 | Ink Set #1b without Vesicles but with Binder, Underprinted with Fixer #1 | Ink Set #1c with Vesicles but without Binder, Underprinted with Fixer #1 | Ink Set #1a without Vesicles and Binder, Not Underprinted |
|---|---|---|---|---|---|
| Cyan C* | 47 | 42 | 45 | 45 | 45 |
| Magenta C* | 66 | 60 | 64 | 59 | 63 |
| Yellow C* | 85 | 67 | 73 | 77 | 79 |
| Red C* | 64 | 50 | 58 | 56 | 52 |
| Green C* | 56 | 50 | 52 | 51 | 54 |
| Blue C* | 45 | 40 | 43 | 41 | 40 |

Example 12
Effect of Underprinting on Color Vividness of Vesicle Ink, Based on a Mixture of Anionic and Cationic Surfactants In this Example, the efficiency of a different vesicle forming surfactant system is presented. Ink set #3 and ink set #4 contained a vesicle-forming mixture of anionic and cationic surfactants, sodium perfluorononanoate, and dodecyltrimethyl ammonium bromide. The ratio of the vesicle forming surfactants was adjusted in such a way so the vesicles would be overall anionic. It can be seen in Table XXI below that underprinting improves somewhat the color vividness of all colors, except cyan and yellow.

TABLE XXI

Effect of Underprinting on Color Vividness of Vesicle Containing Color Ink Set # 3 and Ink Set #4.

| Colors | Ink Set #3, Underprinted by Fixer #2 | Ink Set #3, No Underprint | Ink Set #4, Underprinted by Fixer #2 | Ink #4, No Underprint |
|---|---|---|---|---|
| Cyan C* | 47 | 47 | 47 | 47 |
| Magenta C* | 66 | 65 | 66 | 66 |
| Yellow C* | 77 | 83 | 76 | 81 |
| Red C* | 60 | 58 | 60 | 55 |
| Green C* | 52 | 51 | 54 | 53 |
| Blue C* | 44 | 42 | 46 | 41 |

Example 13
Effect of Underprinting on Color Vividness of the Color Ink, Containing Polyalkylphosphates as the Vesicle-Forming Agent In this Example 13, the effect of underprinting of color vividness of vesicle inks containing polyalkyl phosphates is evaluated. The vesicle-forming surfactant, Zelec NK (Stepan, Norrthfield, Ill.) is the mixture of mono- and diphosphates of fatty alcohols of proprietary composition. Table XXII below shows that the color vividness is improved for magenta, red and blue.

TABLE XXII

Effect of Underprinting on Color Vividness of Vesicle-Containing Color Ink Set #5.

| Colors | Ink #5, Underprinted by Fixer #1 | Ink #5, No Under-Print |
|---|---|---|
| Cyan C* | 47 | 47 |
| Magenta C* | 66 | 64 |
| Yellow C* | 81 | 84 |
| Red C* | 58 | 55 |

TABLE XXII-continued

Effect of Underprinting on Color Vividness of Vesicle-Containing Color Ink Set #5.

| Colors | Ink #5, Underprinted by Fixer #1 | Ink #5, No Under-Print |
|---|---|---|
| Green C* | 56 | 58 |
| Blue C* | 44 | 41 |

Example 14
Underprinting with Polyvalent Metals

Color ink set #1 was modified so that FC-99 surfactant was replaced with 1% of ammonium perfluorooctanoate (Fluka). The ink was underprinted with the Fixer #3. The resulting color vividness is shown in Table XXII, below.

TABLE XXIII

Effect of Underprinting by Fixer #3 on Color Vividness of Vesicle-Containing Modified Color Ink Set #1.

| Colors | Modified Ink #1, Under-Printed by Fixer #1 | Modified Ink #1, No Underprint |
|---|---|---|
| Cyan C* | 48 | 46 |
| Magenta C* | 69 | 65 |
| Yellow C* | 81 | 80 |
| Red C* | 58 | 54 |
| Green C* | 59 | 56 |
| Blue C* | 47 | 43 |

One can see the increased color vividness in all the primary and binary colors.

Example 15
Color Variability of Ink Set #1 Among Different Types of Office Paper The color vividness of ink set #1 was compared over different types of office paper. Overall, 20 different types of paper were studied, including higher-end products, such as Gilbert Bond (Mead), Champion Data Copy (Champion), and Hewlett Packard Bright White paper, and lower end products, such Honshu New Yamayri paper. The results are shown in Table XXIV, which compares color vividness of ink set #1 underprinted by fixer #1 with the default BP-2000c ink over the whole paper set. One can see that the color vividness of ink set #1 is better than that of the default HP-000c inks in all colors, except for the green. Also, the paper-to-paper variability of the 15 color vividness is less for ink set #1.

TABLE XXIV

Chroma Variability over 20 types of Office Paper.

| Chroma over office paper set (average ± standard deviation) | Ink #1 + Fixer #1 | Default HP-2000c ink without underprint |
|---|---|---|
| cyan | 49 ± 1.6 (3.4%) | 46 ± 1.9 (4.1%) |
| magenta | 68 ± 2.1 (3.0%) | 62 ± 2.3 (3.7%) |
| yellow | 86 ± 3.1 (3.5%) | 78 ± 3.1 4.0%) |
| red | 67 ± 1.9 (2.8%) | 54 ± 1.9 (3.4%) |
| green | 55 ± 1.6 (2.9%) | 61 ± 1.7 (2.7%) |
| blue | 44 ± 1.8 (4.1%) | 38 ± 2.1 (5.7%) |

Example 16
Vesicle True Black Ink #6

Vesicle-containing dye-based black was prepared, as described in Table IX above. Table XXV below shows the optical density of the black inks on Gilbert Bond paper. Optical densities (OD) were measured with an RD918 Macbeth spectrophotometer. Note that the optical density of 1.24 is reached at a rather low ink volume, 8 pL per $\frac{1}{600}$ inch pixel. For comparison, the true black ink of HP-2000c printer requires about 4 times as much of the ink coverage. Accordingly, the drying time was faster and the smudge was lower for the vesicle-containing dye-based black ink.

TABLE XXV

Optical Density of #6 True Black Ink.

| | Ink #6, Underprinted by Fixer #1 | Ink #6, No Underprint |
|---|---|---|
| Black Optical Density (OD) | 1.24 | 1.07 |

Example 17
Composite Black of Ink Set #1 Color Ink Set

Figure 4:
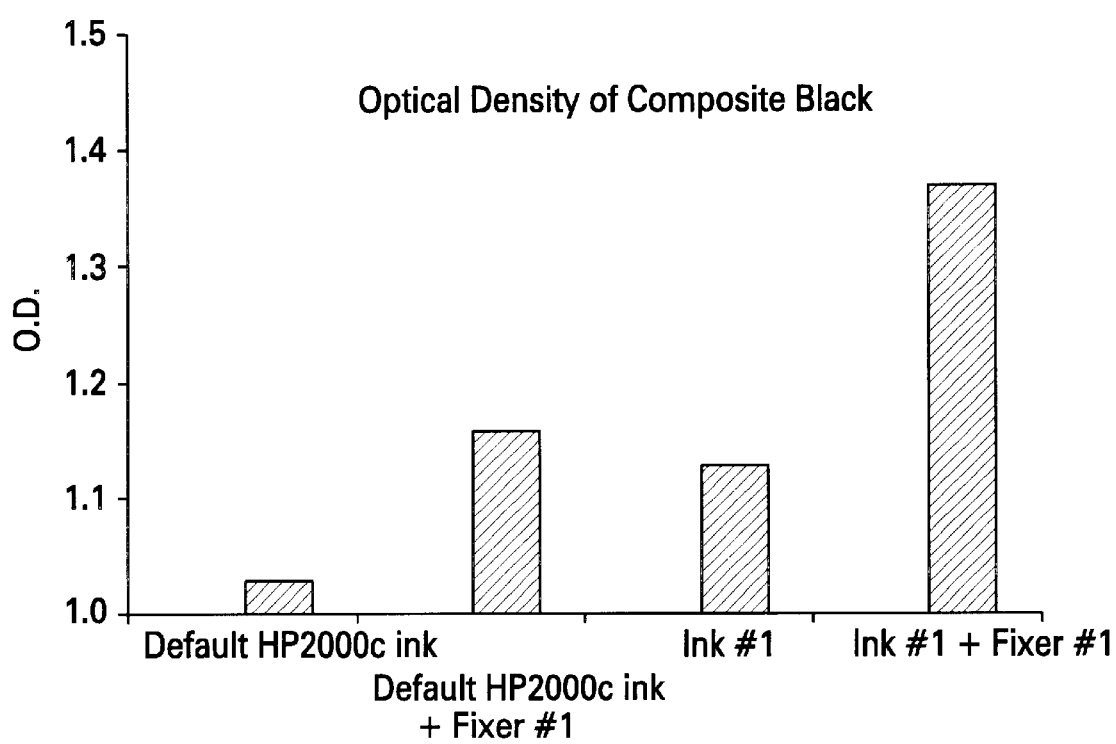
FIG. 4 is the optical density values of composite black of two different inks, with and without fixer on Champion Data Copy paper.

It has been discovered that vesicle inks of the present invention provide a good composite black, which is superior to composite blacks known in art as shown in Table XXVI and FIG. 4. This advantage allows one to have a better half-toning on photographic images without the use of true black. Also, one potentially can print a high quality black text as a composite black.

TABLE XXVI

Composite Black Optical Density on Champion Data Copy Paper.

| Ink set | Ink Set #1, Fixer #1 | Ink Set #1, No Fixer | Default HP-2000 Color Ink, Fixer #1 | Default HP-2000 Color Ink, No Fixer |
|---|---|---|---|---|
| Optical density of composite black (OD) | 1.37 | 1.13 | 1.16 | 1.03 |

Example 18
Comparative Results

In order to evaluate the effect of underprinting on the color vividness of some prior-art inks, the following experiment was conducted. It is known that the Canon BCJ-7000 printer uses the underprinting technology, as described in the U.S. Pat. Nos. 5,624,484 and 5,640,187. By using a commercial Canon BCJ-7000 printer, a sequence of color blocks was printed in the default printer mode on Gilbert Bond (GB) paper. Then the fixer pen was taped and printing was conducted without the fixer. Underprinting substantially improved the color-to-color bleed. However, it made the color vividness worse, as shown in Table XXVII below, in particular, for green, yellow, red, and magenta colors. Only cyan and blue colors were somewhat improved. Note that for the best color inks of the present invention, the color vividness of all colors is improved by underprinting; see Tables XV and XVI above.

TABLE XXVII

Effect of Underprinting on Color Vividness of Commerical Canon BJC-7000 Printer.

| Colors | Canon BCJ-7000 Printer on GB, Default Underprint | Canon BCJ-7000 Printer on GB, No Underprint) |
|---|---|---|
| Cyan C* | 48 | 44 |
| Magenta C* | 60 | 66 |
| Yellow C* | 72 | 82 |
| Red C* | 55 | 64 |
| Green C* | 40 | 53 |
| Blue C* | 40 | 37 |

Example 19

Effect of Underprinting on Waterfastness of Ink Set #1

To evaluate waterfastness, water was dripped on the sequence of color stripes, printed on paper. The transferred optical density was measured between the stripes and was considered as the measure of the waterfastness of the image. Optical densities (OD) were measured with an RD918 Macbeth spectrophotometer. Table XXVIII compares the waterfastness of ink set #1 underprinted by fixer #1 with the waterfastness default HP-2000c inks. One can see a substantial improvement in waterfastness of cyan and magenta.

TABLE XXVIII

Waterfastness of Ink Set #1 Underprinted by Fixer #1 and Default HP-2000c Inks.

| | Ink Set #1/Fixer #1 | | | Default HP-2000c Inks | | |
|---|---|---|---|---|---|---|
| Color | OD | OD transferred | % | OD | OD transferred | % |
| C | 1.28 | 0.13 | 10 | 1.12 | 0.23 | 22 |
| M | 1.27 | 0.11 | 9 | 1.08 | 0.22 | 20 |
| Y | 1.19 | 0.19 | 16 | 1.03 | 0.18 | 18 |

Example 20
Bleed, Edge Acuity, and Area Fill Uniformity

Underprinting of vesicle inks provides excellent reduction in color-to-color bleed and excellent edge acuity. The benefit in the edge acuity can be seen in Table XXIX, which compares the line roughness factor averaged over all primary and secondary colors for ink set #1 of the present invention and commercial HP-2000c ink.

TABLE XXIX

Line Roughness Factor for Ink Set #1 Versus That of Default HP-2000c Inks on Champion Data Copy Paper.

| Ink | Line Roughness Factor |
|---|---|
| Ink Set #1 + Fixer #2 | 1.6 ± 0.15 |
| Default HP-2000c | 1.9 ± 0.06 |

Another advantage of vesicle inks underprinted according to the present invention is the excellent area fill uniformity. Thus, inks of prior art, such as commercial HP-2000c inks show a substantial penetration into the paper. As a result, paper fibers can be seen through the color blocks and the image contains a large number of white spots. On the other hand, the inks of the present invention provide a very uniform area fill and paper fibers cannot be seen through. This has a particular advantage for the color text quality and for the quality of images and diagrams.

INDUSTRIAL APPLICABILITY

The vesicle-containing inks of the present invention are expected to find use in ink-jet printers.

Thus, there has been disclosed a dye-based ink-jet ink containing vesicles of one electrical charge sign, employed in combination with underprinting of a fixer of the opposite charge sign. It will be readily apparent to those skilled in this art that various changes and modifications may be made, and all such changes and modifications are intended to fall within the scope of the invention, as defined by the appended claims.

What is claimed is:

1. An aqueous dye-based ink, containing at least one water-soluble dye having a charge of a first sign and vesicles formed from at least one surfactant, said vesicles comprising a bilayer wall having two or an even number of monolayers connected back-to-back to form a wall defining an interior and an exterior thereof, said water-soluble dye being primarily distributed between said interior and said exterior of said vesicles, said ink additionally containing a polymeric binder, carrying a charge of said first sign as molecules of said dye.

2. The aqueous dye-based ink of claim 1, wherein at least 5% of said water-soluble dye is trapped in said vesicle interior.

3. The aqueous dye-based ink of claim 1, wherein said dye has a color of cyan, yellow, magenta, or black.

4. The aqueous dye-based ink of claim 1, wherein said vesicles carry either no charge or a net charge of said first sign as molecules of said dye.

5. The aqueous dye-based ink of claim 1, wherein said ink additionally contains humectants and co-solvents, selected from the group consisting of polyols, polyol ethers, and 2-pyrrolidone.

6. The aqueous dye-based ink of claim 1, wherein said ink additionally contains a spreading agent, which is either non-ionic or carries a charge of said first sign as molecules of said dye.

7. The aqueous dye-based ink of claim 6, wherein said spreading agent comprises a surfactant that contains fluorine or silicon.

8. The aqueous dye-based ink of claim 1, wherein said vesicle-forming surfactant is selected from the group consisting of phospholipids and a mixture of phospholipids.

9. The aqueous ink of claim 8 wherein said phospholipids are selected from the group consisting of phosphatidylcholine, phosphatidylethanolamine, lysophosphatidylcholine, phosphatidylserine, phosphatidic acid, and phosphatidylglycerol, and mixtures thereof.

10. The aqueous ink of claim 8, where the phospholipid is a natural extract selected from the group consisting of eggs, soya beans, bovine liver, bovine brain, and krill.

11. The aqueous dye-based ink of claim 1, wherein said vesicle-forming surfactant is a monoalkyl phosphate or polyalkylphosphate, or a mixture thereof.

12. The aqueous dye-based ink of claim 1, wherein said vesicle-forming surfactant is a mixture of an anionic surfactant and a cationic surfactant, carrying a net charge of said first sign as molecules of said dye.

13. The aqueous dye-based ink of claim 1, wherein said ink additionally contains a biocide.

14. The aqueous dye-based ink of claim 1, wherein said ink additionally contains a chelating agent.

15. The aqueous dye-based ink of claim 1, wherein said ink additionally contains an antioxidant.

16. The aqueous dye-based ink of claim 1, wherein said vesicles are present in an amount ranging from about 1 to 10 wt %, while maintaining viscosity of said ink at a value of no more than about 4 cp.

17. An ink-jet printing ink system, consisting essentially of (a) said aqueous dye-based vesicle ink of claim 1, comprising at least one cyan, magenta, or yellow dye, and (b) a clear fixer fluid, which is deposited on paper prior to color inks, said fixer fluid containing a polymer or a polyvalent ion, or both, and having an electric charge opposite to said charge of said dyes.

18. The ink-jet printing ink system of claim 17, wherein said polymer is a cationic polymer, selected from polyethyleneimine, polyvinylpyrrolidone and polyallylamine, or other polymeric amine in an acid-quaternized form.

19. The ink-jet printing ink system of claim 17, wherein said polyvalent ion is $Ca^{2+}$, $Mg^{2+}$, $Al^{3+}$, or $Ba^{2+}$.

20. The ink-jet printing ink system of claim 17, wherein said fixer fluid additionally contains humectants and co-solvents, selected from the group consisting of polyols, polyol ethers, and 2-pyrrolidone.

21. The ink-jet printing ink system of claim 17, wherein said fixer fluid additionally contains spreading surfactant agents.

22. The ink-jet printing ink system of claim 21, wherein said spreading surfactant comprises a hydrocarbon molecule having an HLB value of 6 to 14 and a branched structure of alkyl tail.

23. The ink-jet printing ink system of claim 21, wherein said spreading surfactant comprises a molecule with a fluorocarbon alkyl tail and a polyoxyethylene polar head.

24. A method for improving chroma, color-to-color bleed, and edge acuity in a dye-based ink-jet ink, said method comprising:

providing an ink set comprising cyan, yellow, and magenta inks, each ink contained in a separate pen and containing at least one water-soluble dye and vesicles, said vesicles present in an amount sufficient to contain a substantial fraction of the dye molecules within said vesicles, said vesicles formed from a surfactant having a first charge sign;

providing an additional pen containing a fixer having a second charge sign, opposite to said first charge sign;

printing said fixer on a print medium; and printing at least one said ink on said fixer.

25. The method of claim 24 wherein said vesicles are present in an amount ranging from about 1 to 10 wt %, while maintaining viscosity of said ink at a value of no more than about 4 cp.

26. The method of claim 25 wherein said vesicles are present in an amount ranging from about 3 to 5 wt %.

27. The method of claim 24 wherein vesicles are negatively charged and said fixer comprises a cationic polymer.

28. The method of claim 27 wherein said cationic polymers are selected from the group consisting of quaternized polyethyleneimines, quaternized polyvinylpyrrolidone, and quaternized polyallylamine, and polymeric amines.

29. The method of claim 27 wherein said cationic polymers are branched.

30. The method of claim 24 wherein said fixer and said at least one ink are printed on the same pass.

* * * * *